United States Patent
Song et al.

(10) Patent No.: US 12,208,506 B2
(45) Date of Patent: Jan. 28, 2025

(54) DUAL-AIRWAY BIONIC SNAIL SOFT ROBOT

(71) Applicant: SOUTHEAST UNIVERSITY, Nanjing (CN)

(72) Inventors: Aiguo Song, Nanjing (CN); Qinjie Ji, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/920,990

(22) PCT Filed: Apr. 1, 2022

(86) PCT No.: PCT/CN2022/084829
§ 371 (c)(1),
(2) Date: Oct. 24, 2022

(87) PCT Pub. No.: WO2023/178726
PCT Pub. Date: Sep. 28, 2023

(65) Prior Publication Data
US 2024/0051151 A1    Feb. 15, 2024

(30) Foreign Application Priority Data
Mar. 23, 2022   (CN) .......................... 202210289781.5

(51) Int. Cl.
*B25J 11/00*    (2006.01)
*B25J 13/08*    (2006.01)

(52) U.S. Cl.
CPC ............... *B25J 11/00* (2013.01); *B25J 13/08* (2013.01)

(58) Field of Classification Search
CPC ......... F16B 15/103; B25J 9/1075; B25J 9/142
See application file for complete search history.

(56) References Cited

U.S. PATENT DOCUMENTS

| | | | |
|---|---|---|---|
| 10,527,507 B2 * | 1/2020 | Wood .................... | A43B 23/029 |
| 10,576,643 B2 * | 3/2020 | Lessing .................. | B25J 13/088 |

(Continued)

FOREIGN PATENT DOCUMENTS

| | | |
|---|---|---|
| CN | 105479463 A | 4/2016 |
| CN | 108263504 A | 7/2018 |

(Continued)

OTHER PUBLICATIONS

Yuan Xin, Liquid Metal based Flexible Sensors for Soft Robotics, Thesis, Soochow University, Feb. 15, 2021, 81 pages.

(Continued)

*Primary Examiner* — Bobby Rushing, Jr.
(74) *Attorney, Agent, or Firm* — MUNCY, GEISSLER, OLDS & LOWE, P.C.

(57) ABSTRACT

The present invention discloses a dual-airway bionic snail soft robot, which includes ventral muscular feet, an air pressure controlling device and mucus, wherein the ventral muscular foot includes an upper deformation layer, a lower deformation layer and a strain sensor. Snail ventral muscular feet are simulated by the upper deformation layer and the lower deformation layer to produce wave motion. The strain sensor senses a wave motion state of the soft robot to provide a basis for the air pressure controlling device to output air pressure. In another aspect, snail mucus is replaced with glycerin to produce a suction force and improve crawling efficiency. The designed bionic snail soft robot can move forward, move backward and turn in situ, thereby realizing free movement in a microgravity environment.

9 Claims, 10 Drawing Sheets

(56) References Cited

U.S. PATENT DOCUMENTS

| | | | |
|---|---|---|---|
| 11,060,511 B1 * | 7/2021 | Kartalov | B25J 9/10 |
| 2015/0266186 A1 | 9/2015 | Mosadegh et al. | |
| 2018/0264643 A1 * | 9/2018 | Rabani | B25J 9/1615 |
| 2021/0308861 A1 * | 10/2021 | Zhang | B25J 9/142 |
| 2022/0040868 A1 | 2/2022 | Onal et al. | |

FOREIGN PATENT DOCUMENTS

| | | | | |
|---|---|---|---|---|
| CN | 109760086 A | * | 5/2019 | |
| CN | 110104083 A | | 8/2019 | |
| CN | 111497958 A | | 8/2020 | |
| CN | 112500603 A | * | 3/2021 | C08J 9/0066 |
| CN | 112894844 A | | 6/2021 | |
| CN | 111497958 B | * | 8/2021 | B62D 57/02 |
| CN | 113773524 A | * | 12/2021 | |
| CN | 113799887 A | * | 12/2021 | |
| CN | 112549009 B | | 2/2022 | |
| CN | 114055453 A | | 2/2022 | |

OTHER PUBLICATIONS

Zuoyan Xi, Research on Biomimetic Crawling Robot Based on Pneumatic Soft Actuator, a dissertation for Professional Master's Degree, Harbin Engineering University, Aug. 15, 2018, 83 pages.
Yangqiao Lin, Research on Key Technology of Fluid Driven Modular Soft Robot, Aug. 15, 2019, 138 pages, China Academic Journal Electronic Publishing House.

* cited by examiner

DUAL-AIRWAY BIONIC SNAIL SOFT ROBOT

TECHNICAL FIELD

The present invention belongs to the technical field of soft robots, and specifically relates to a dual-airway bionic snail soft robot.

BACKGROUND

In the field of deep space exploration, how to realize movement of a robot in microgravity environments such as a comet and an asteroid is a key technology. Conventional crawler, wheeled, and wheel-legged mobile robots rely on gravity to produce friction, which makes the robots difficult to move, surmount obstacles, climb walls, etc. in the microgravity environment, and even a propeller-type aircraft cannot work in space without atmosphere.

In nature, a snail can move freely on a hanging leaf, a sloping branch, a rough or smooth vertical wall, and even hang upside down on an object, which has very high environmental adaptability. The snail belongs to gastropods, and produces continuous waveforms relying on soft ventral muscular feet to move forward, and mucus secreted by ventral muscular feet thereof not only can produce a suction force but also can reduce friction between muscles and the ground, thereby realizing efficient and stable movement. At present, a soft robot has been paid more and more attention in the fields of medical treatment, rescue, exploration, and detection due to inherent high flexibility, good compliance and excellent adaptability, and shows a huge development potential. A pneumatic soft robot occupies an important position in the field of soft robots due to characteristics such as light weight, high efficiency, no pollution and strong environmental adaptability. Therefore, it is necessary to combine a bionic snail with a soft robot to develop a soft crawling robot that can move freely in the microgravity environment.

The patent document published on Mar. 26, 2021, with a Chinese patent application No. CN202011364112.7, proposes a programmable intelligent material-based bionic wave-shaped soft robot. One end of a drive layer of the soft robot is of a wave-shaped convex structure, and the other end is of a wave-shaped concave structure, which can convert simple deformation of a programmable intelligent material into reciprocating expansion and contraction of an overall structure, thereby realizing crawling motion. The motion of the soft robot needs to rely on a friction difference between both feet but is not suitable for the microgravity environment, and there is a problem that it is difficult to find an intelligent material that meets the requirements.

The patent document published on Feb. 18, 2022, with a Chinese patent application No. CN202111509823.3 proposes a multi-modal motion bionic inchworm crawling and climbing soft robot, and feet thereof can be ground-gripfixed by negative-pressure suction, but cannot be fixed on surfaces of the comet, the asteroid and the like without atmosphere.

At present, how to make the mobile robots adapt to microgravity and a non-atmospheric environment is an urgent problem to be solved.

SUMMARY

In order to solve the above problems, the present invention discloses a dual-airway bionic snail soft robot. In one aspect, snail ventral muscular feet are simulated through a reasonable layout of airways and air pressure control to produce wave motion, and in another aspect, snail mucus is replaced with glycerin to produce a suction force and improve crawling efficiency. The designed bionic snail soft robot can move forward, move backward and turn in situ.

In order to achieve the above objectives, the present invention adopts the following technical solution:

A dual-airway bionic snail soft robot, which includes ventral muscular feet, an air pressure controlling device and mucus, wherein the ventral muscular foot includes an upper deformation layer, a lower deformation layer and a strain sensor, the upper deformation layer is above the lower deformation layer, the upper deformation layer includes upper-layer air cavities, upper-layer connecting airways, upper-layer limiters and upper-layer air holes, the upper-layer air cavities are equidistantly and centrally arranged in a long side direction of the ventral muscular foot, the upper-layer limiters and the upper-layer air cavities are in one-to-one correspondence, the upper-layer limiter is disposed directly above the upper-layer air cavity, and the upper-layer limiter can limit deformation of the upper-layer air cavity on a side where the upper-layer limiter is located.

As a preferred solution, the upper-layer limiter is a cloth strip, gauze or a plastic sheet. The upper-layer connecting airways connect the upper layer air cavities with the upper layer air holes, the upper layer air holes are provided in one side of the upper deformation layer, and the upper layer air holes are connected with an external air source.

The lower deformation layer includes lower-layer air cavities, lower-layer connecting airways, lower-layer limiters and lower-layer air holes, the lower-layer air cavities are equidistantly and centrally arranged in a long side direction of the ventral muscular foot, and the lower-layer limiter is disposed directly below the lower-layer air cavity, the lower-layer limiter can limit deformation of the lower-layer air cavity on a side where the lower-layer limiter is located.

As a preferred solution, the lower-layer limiter is a cloth strip or gauze or a plastic sheet.

The lower-layer connecting airways connect the lower-layer air cavities with the lower-layer air holes, the lower-layer air holes are provided in one side of the lower deformation layer, and the lower-layer air holes are connected with an external air source.

As a preferred solution, the lower-layer air cavities and the upper-layer air cavities are staggered, and the lower-layer air cavities do not overlap with the upper-layer air cavities in a vertical direction.

As a preferred solution, the strain sensor is buried in the ventral muscular foot in the long side direction of the ventral muscular foot, the strain sensor includes a strain channel and a conductive liquid, and the conductive liquid is encapsulated in the strain channel.

As a preferred solution, the ventral muscular foot is made of silicone rubber.

As a preferred solution, the conductive liquid is liquid metal or salt water.

As a preferred solution, the mucus is glycerol and is applied to a position between the ventral muscular foot and a crawling surface.

The air pressure controlling device includes a microcontroller, a dual-way air source controller and a strain signal conditioning circuit. The dual-way air source controller includes a DA module, an electro-pneumatic proportional valve I and an electro-pneumatic proportional valve II, a signal control end of the DA module is connected to the microcontroller, the DA module produces two analog voltages under the control of the microcontroller, the two analog voltages produced by the DA module are respectively connected to a signal end of the electro-pneumatic proportional valve I and a signal end of the electro-pneumatic proportional valve II, the electro-pneumatic proportional valve I and the electro-pneumatic proportional valve II output corresponding air pressure according to the analog voltages, and the electro-pneumatic proportional valve I and the electro-pneumatic proportional valve II have an equivalent function and can be exchanged in sequence.

The strain signal conditioning circuit includes a constant current source generator, a voltage measurement module, a probe I and a probe II. A signal control end of the constant current source generator is connected to the microcontroller, a current output end of the constant current source generator is connected to the probe I, and a current input end of the constant current source generator is connected to the probe II, and voltage measurement ends of the voltage measurement module are respectively connected to the current output end and the current input end of the constant current source generator.

As a preferred solution, another structural form of the dual-airway bionic snail soft robot is a dual-ventral muscular foot parallel bionic snail soft robot, which includes a ventral muscular foot A, a ventral muscular foot B, a connecting rod A, a connecting rod B, an air pressure controlling device A and an air pressure controlling device B. An air pressure output end of an electro-pneumatic proportional valve I of the air pressure controlling device A is connected to upper-layer air holes of the ventral muscular foot A, an air pressure output end of an electro-pneumatic proportional valve II of the air pressure controlling device A is connected to lower-layer air holes of the ventral muscular foot A, and a probe I of the air pressure controlling device A pierces into one end of a strain sensor of the ventral muscular foot A and keeps good contact with conductive liquid, and a probe II of the air pressure controlling device A pierces into the other end of the strain sensor of the ventral muscular foot A and keeps good contact with the conductive liquid.

An air pressure output end of an electro-pneumatic proportional valve I of the air pressure controlling device B is connected to upper-layer air holes of the ventral muscular foot B, an air pressure output end of an electro-pneumatic proportional valve II of the air pressure controlling device B is connected to lower-layer air holes of the ventral muscular foot B, a probe I of the air pressure controlling device B pierces into one end of a strain sensor of the ventral muscular foot B and keeps good contact with conductive liquid, and a probe II of the air pressure controlling device B pierces into the other end of the strain sensor of the ventral muscular foot B and keeps good contact with the conductive liquid.

One end of the ventral muscular foot A and one end of the ventral muscular foot B are fixedly mounted through the connecting rod A, the other end of the ventral muscular foot A and the other end of the ventral muscular foot B are fixedly mounted through the connecting rod B, and the ventral muscular foot A is parallel to the ventral muscular foot B.

The mucus is applied to a position between the ventral muscular foot A and the crawling surface and a position between the ventral muscular foot B and the crawling surface.

Beneficial effects of the present invention are:

According to soft mobile robot designed based on a snail crawling mode in the present invention, the snail ventral muscular feet are simulated by the upper deformation layer and the lower deformation layer to produce the wave motion, and the strain sensor senses the wave motion state of the soft robot to provide a basis for the air pressure controlling device to output the air pressure. In another aspect, the snail mucus is replaced with the glycerin to produce the suction force and improve the crawling efficiency, thereby realizing the free movement in the microgravity environment.

LIST OF REFERENCE NUMERALS

Figure 1:
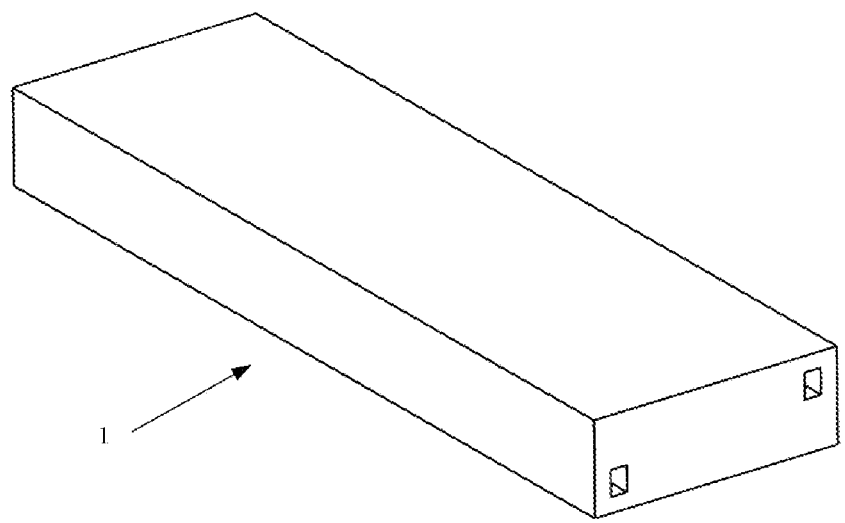
FIG. 1 is a structural diagram of a ventral muscular foot designed by the present invention.
Figure 2:
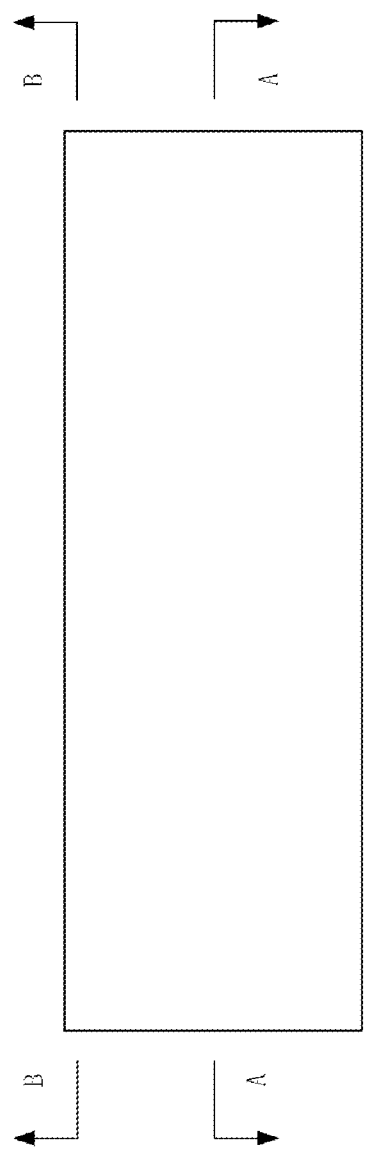
FIG. 2 is a top view of a ventral muscular foot designed by the present invention.
Figure 3:
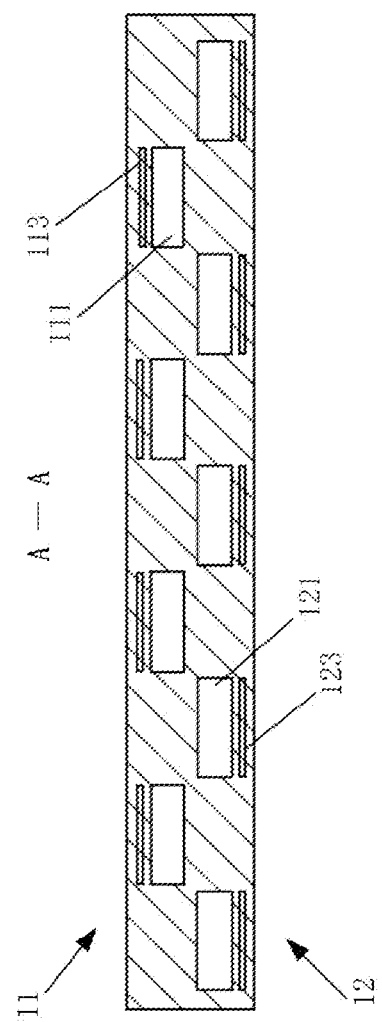
FIG. 3 is a sectional view along line A-A in FIG. 2.
Figure 4:
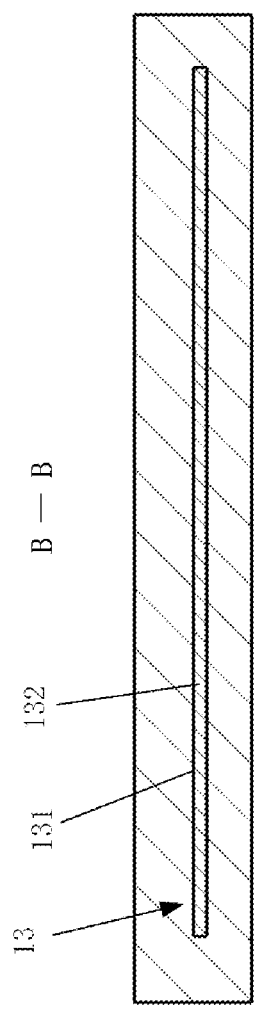
FIG. 4 is a sectional view along line B-B in FIG. 2.
Figure 5:
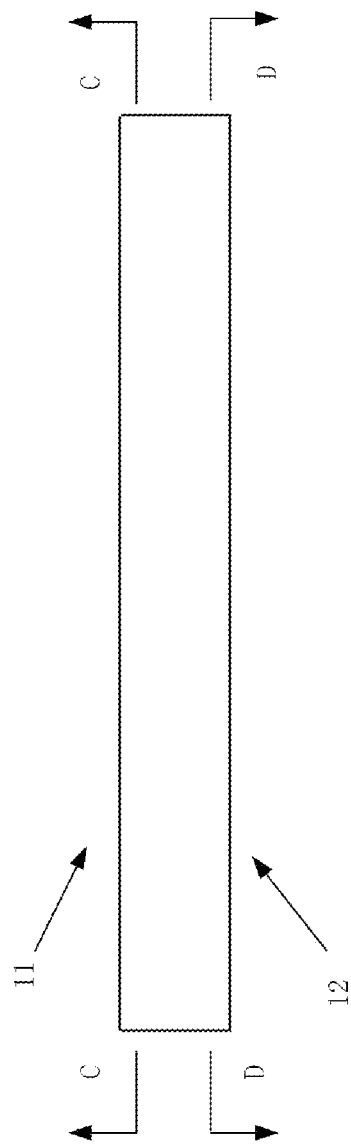
FIG. 5 is a front view of a ventral muscular foot designed by the present invention.
Figure 6:
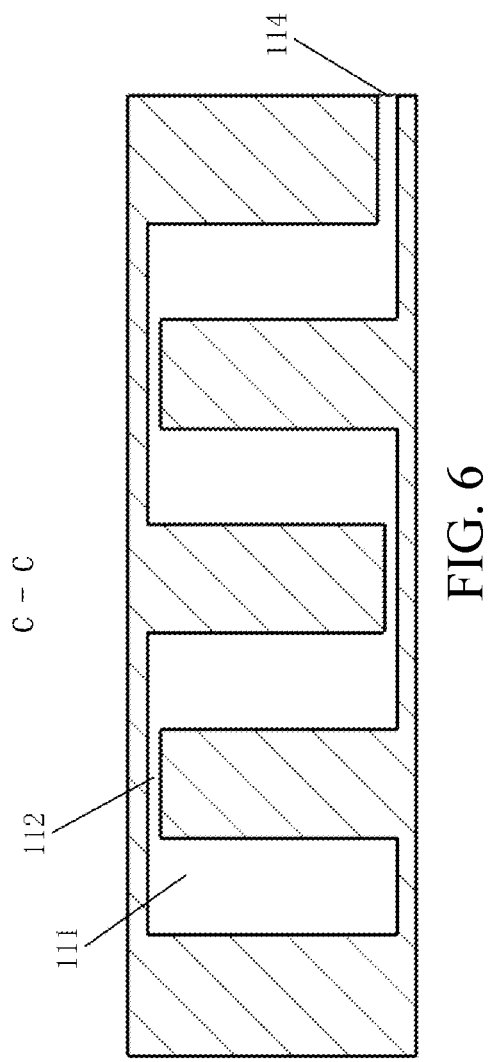
FIG. 6 is a sectional view along line C-C in FIG. 5.
Figure 7:
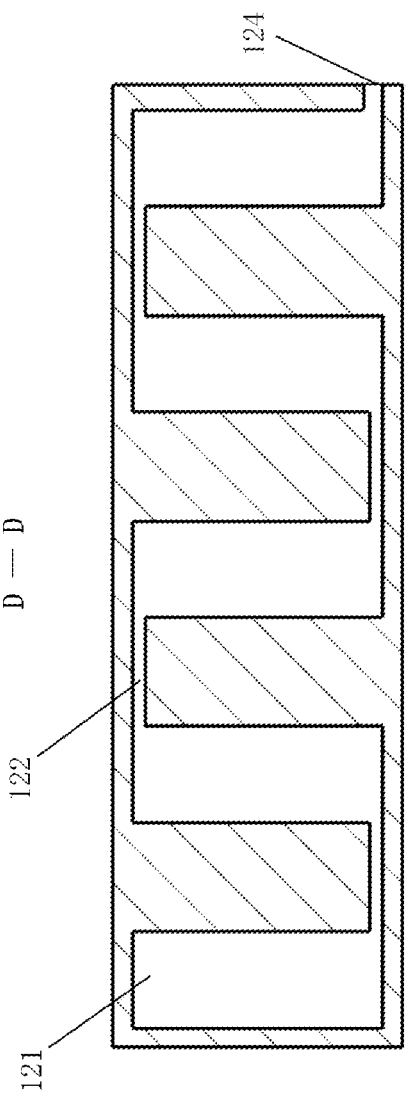
FIG. 7 is a sectional view along line D-D in FIG. 5.

1. Ventral Muscular Foot, 11. Upper Deformation Layer, 111. Upper-Layer Air Cavity, 112. Upper-Layer Connecting Airway, 113. Upper-Layer Limiter, 114. Upper-Layer Air Hole, 12. Lower Deformation Layer, 121. Lower-Layer Air Cavity, 122. Lower-Layer Connecting Airway, 123. Lower-Layer Limiter, 124. Lower-Layer Air Hole, 13. Strain Sensor, 131. Strain Channel, 132. Conductive Liquid, 2. Air Pressure Controlling Device, 21. Microcontroller, 22. Dual-Way Air Source Controller, 221. DA Module, 222. Electro-Pneumatic Proportional Valve I, 223. Electro-Pneumatic Proportional Valve II, 23. Strain Signal Conditioning Circuit, 231. Constant Current Source Generator, 232. Voltage Measurement Module, 233. Probe I, 234. Probe II, 1A. Ventral Muscular Foot A, 1B. Ventral Muscular Foot B, 3A. Connecting Rod A, and 3B. Connecting Rod B.

DETAILED DESCRIPTION

The present invention will be further described below in combination with the specific implementations with reference to the drawings. It should be understood that the following specific implementations are only used to describe the present invention and not to limit the scope of the present invention.

Embodiment 1

As shown in FIGS. 1 to 7, the ventral muscular foot 1 includes an upper deformation layer 11, a lower deformation layer 12 and a strain sensor 13. The upper deformation layer 11 is above the lower deformation layer 12. The upper deformation layer 11 includes upper-layer air cavities 111, upper-layer connecting airways 112, upper-layer limiters 113 and upper-layer air holes 114. The upper-layer air cavities 111 are equidistantly and centrally arranged in a long side direction of the ventral muscular foot 1. The upper-layer limiters 113 and the upper-layer air cavities 111 are in one-to-one correspondence. The upper-layer limiter 113 is disposed directly above the upper-layer air cavity 111. The upper-layer connecting airways 112 connect the upper-layer air cavities 111 with the upper-layer air holes 114. The upper-layer air holes 114 are provided in one side of the upper deformation layer 11. The upper-layer air holes 114 are connected with an external air source.

The lower deformation layer 12 includes lower-layer air cavities 121, lower-layer connecting airways 122, lower-layer limiters 123 and lower-layer air holes 124. The lower-layer air cavities 121 are equidistantly and centrally arranged in the long side direction of the ventral muscular foot 1. The lower-layer limiter 123 is disposed directly below the lower-layer air cavity 121. The lower-layer connecting airways 122 connect the lower-layer air cavities 121 with the lower-layer air holes 124. The lower-layer air holes 124 are provided in one side of the lower deformation layer 12. The lower-layer air holes 124 are connected with an external air source. For the convenience of connection, the upper-layer air holes 114 and the lower-layer air holes 124 can be provided in the same side and not in the side where the ventral muscular foot 1 will produce the wave motion.

The upper-layer limiter 113 can limit deformation of the upper-layer air cavity 111 on a side where the upper-layer limiter 113 is located. The lower-layer limiter 123 can limit deformation of the lower-layer air cavity 121 on a side where the lower-layer limiter 123 is located. The lower-layer air cavities 121 and the upper-layer air cavities 111 are staggered, and the lower-layer air cavities 121 do not overlap with the upper-layer air cavities 111 in a vertical direction.

The strain sensor 13 is buried in the ventral muscular foot 1 in the long side direction of the ventral muscular foot 1. The strain sensor 13 includes a strain channel 131 and a conductive liquid 132. The conductive liquid 132 is encapsulated in the strain channel 131. The long side direction of the ventral muscular foot 1 is a direction in which the ventral muscular foot 1 will produce the wave motion, and the strain sensor 13 measures the wave motion state of the ventral muscular foot 1.

Figure 9:
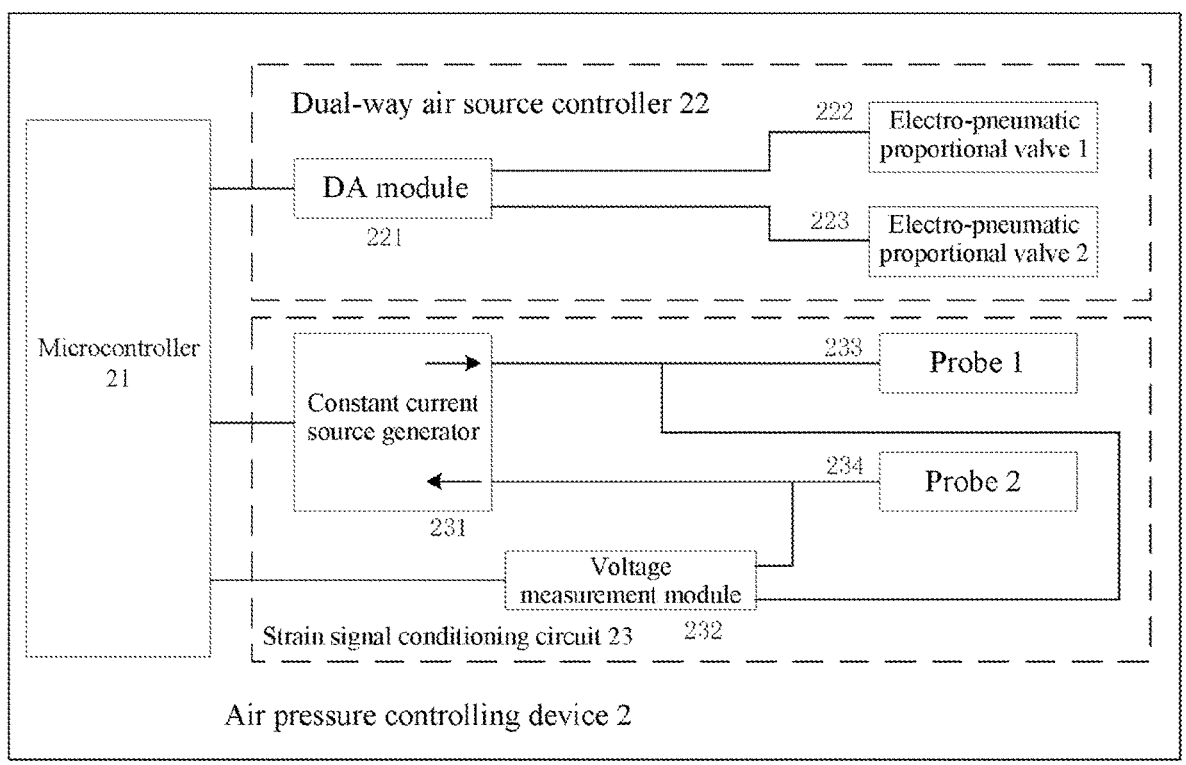
FIG. 9 is a schematic structural diagram of an air pressure controlling device designed by the present invention.

As shown in FIG. 9, the air pressure controlling device 2 includes a microcontroller 21, a dual-way air source controller 22 and a strain signal conditioning circuit 23. The dual air source controller 22 includes a DA module 221, an electro-pneumatic proportional valve I 222 and an electro-pneumatic proportional valve II 223. A signal control end of the DA module 221 is connected to the microcontroller 21. The DA module 221 produces two analog voltages under the control of the microcontroller 21. The two analog voltages produced by the DA module 221 are respectively connected to a signal end of the electro-pneumatic proportional valve I 222 and a signal end of the electro-pneumatic proportional valve II 223. The electro-pneumatic proportional valve I 222 and the electro-pneumatic proportional valve II 223 output corresponding air pressure according to the analog voltages.

An air pressure output end of the electro-pneumatic proportional valve I 222 is connected to the upper-layer air holes 114, and an air pressure output end of the electro-pneumatic proportional valve II 223 is connected to the lower-layer air holes 124. It is to be noted here that the electro-pneumatic proportional valve I 222 and the electro-pneumatic proportional valve II 223 function equivalently and can be exchanged in sequence, that is, the air pressure output end of the electro-pneumatic proportional valve I 222 can also be connected to the lower-layer air holes 124, and at this time, the air pressure output end of the electro-pneumatic proportional valve II 223 is connected to the upper-layer air holes 114.

The strain signal conditioning circuit 23 includes a constant current source generator 231, a voltage measurement module 232, a probe I 233 and a probe II 234. A signal control end of the constant current source generator 231 is connected to the microcontroller 21. A current output end of the constant current source generator 231 is connected to the probe II 233. A current input end of the constant current source generator 231 is connected to the probe II 234. Voltage measurement ends of the voltage measurement module 232 are respectively connected to the current output end and the current input end of the constant current source generator 231. The probe I 233 pierces into one end of the strain sensor 13 and keeps good contact with the conductive liquid 132, and the probe II 234 pierces into the other end of the strain sensor 13 and keeps good contact with the conductive liquid 132.

When the ventral muscular foot 1 produces the wave motion, deformation of the strain channel 131 causes the length and cross-sectional area of the conductive liquid 132 therein to change, thereby causing resistance thereof to change. Also, since a current with constant magnitude flows out from the probe I 233, flows through the conductive liquid 132 and then flows back through the probe II 234, the change in resistance of the conductive liquid 132 will result in a change in voltage between the probe I 233 and the probe II 234, and then the voltage detected by the voltage measurement module 232 reflects the wave motion state of the ventral muscular foot 1. Further, the microcontroller 21 controls the output air pressure of the electro-pneumatic proportional valve I 222 and the electro-pneumatic proportional valve II 223 according to the voltage detected by the voltage measurement module 232, and finally, the stable sinusoidal wave motion of the ventral muscular foot 1 is realized.

In order to simulate the snail mucus to produce the suction force and improve the crawling efficiency, the mucus is replaced with glycerin and the glycerin is applied to a position between the ventral muscular foot 1 and the crawling surface, and the viscosity and liquid capillary force of the glycerin make the ventral muscular feet 1 sucked onto the crawling surface, thereby realizing crawling under the microgravity environment.

Figure 8:
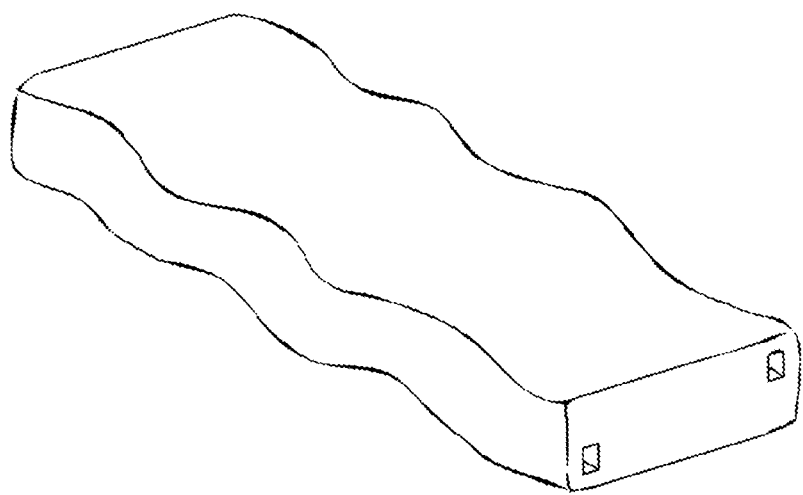
FIG. 8 is a structural diagram of a ventral muscular foot designed by the present invention under a wave motion state.

As shown in FIG. 8, the ventral muscular foot 1 produces the sinusoidal wave motion under the drive of the air pressure controlling device 2, which can realize moving forward and moving backward.

Embodiment 2

Figure 10:
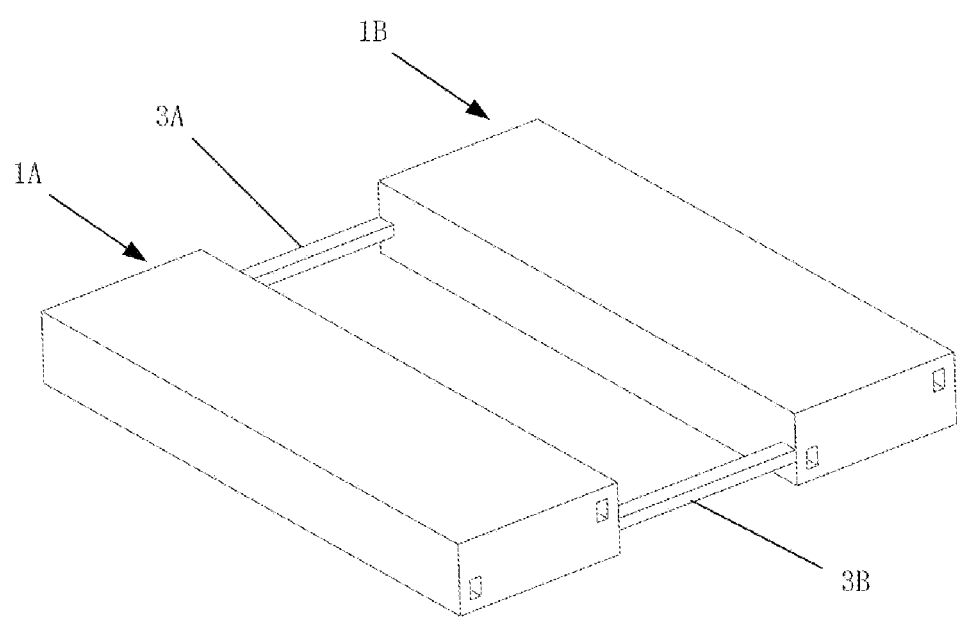
FIG. 10 is a structural diagram of a dual-ventral muscular foot parallel bionic snail soft robot designed by the present invention.

As shown in FIG. 10, another structural form of the dual-airway bionic snail soft robot is a dual-ventral muscular foot parallel bionic snail soft robot, which includes a ventral muscular foot A 1A, a ventral muscular foot B 1B, a connecting rod A 3A, a connecting rod B 3B, an air pressure controlling device A and an air pressure controlling device B. An air pressure output end of an electro-pneumatic proportional valve I of the air pressure controlling device A is connected to upper-layer air holes of the ventral muscular foot A 1A. An air pressure output end of an electro-pneumatic proportional valve II of the air pressure controlling device A is connected to lower-layer air holes of the ventral muscular foot A 1A. A probe I of the air pressure controlling device A pierces into one end of a strain sensor of the ventral muscular foot A 1A and keeps good contact with conductive liquid, and a probe II of the air pressure controlling device A pierces into the other end of the strain sensor of the ventral muscular foot A 1A and keeps good contact with the conductive liquid.

An air pressure output end of an electro-pneumatic proportional valve I of the air pressure controlling device B is connected to upper-layer air holes of the ventral muscular foot B 1B. An air pressure output end of an electro-pneumatic proportional valve II of the air pressure controlling device B is connected to lower-layer air holes of the ventral muscular foot B 1B. A probe I of the air pressure controlling device B pierces into one end of a strain sensor of the ventral muscular foot B 1B and keeps good contact with the conductive liquid. A probe II of the air pressure controlling device B pierces into the other end of the strain sensor of the ventral muscular foot B 1B and keeps good contact with the conductive liquid.

One end of the ventral muscular foot A 1A and one end of the ventral muscular foot B 1B are fixedly mounted through the connecting rod A 3A. The other end of the ventral muscular foot A 1A and the other end of the ventral muscular foot B 1B are fixedly mounted through the connecting rod B 3B. The ventral muscular foot A 1A is parallel to ventral muscular foot B 1B.

The mucus was applied to a position between the ventral muscular foot A 1A and a crawling surface and a position between the ventral muscular foot B 1B and the crawling surface.

When the ventral muscular foot A 1A and the ventral muscular foot B 1B of the dual-ventral muscular foot parallel bionic snail soft robot have a same wave motion direction, the soft robot can move forward and move backward, and when the ventral muscular foot A 1A and the ventral muscular foot B 1B have opposite wave motion directions, the soft robot can turn in situ.

It should be noted that the above content only illustrates the technical idea of the present invention, and the protection scope of the present invention is not limited. A person of ordinary skill in the art may make some improvements and modifications without departing from the principle of the present invention and the improvements and modifications fall within the protection scope of the claims of the present invention.

What is claimed is:

1. A dual-airway bionic snail soft robot, comprising:
a ventral muscular foot, an air pressure controlling device and mucus, wherein the ventral muscular foot comprises an upper deformation layer, a lower deformation layer and a strain sensor, the upper deformation layer is above the lower deformation layer, the upper deformation layer comprises upper-layer air cavities, upper-layer connecting airways, upper-layer limiters and an upper-layer air hole, the upper-layer air cavities are equidistantly and centrally arranged in a long side direction of the ventral muscular foot, the upper-layer limiters and the upper-layer air cavities are in one-to-one correspondence, the upper-layer limiter is disposed directly above the upper-layer air cavity, the upper-layer connecting airways connect the upper-layer air cavities with the upper-layer air hole, the upper-layer air hole is provided in one side of the upper deformation layer, and the upper-layer air hole is connected with an external air source;
the lower deformation layer comprises lower-layer air cavities, lower-layer connecting airways, lower-layer limiters and a lower-layer air hole, the lower-layer air cavities are equidistantly and centrally arranged in the long side direction of the ventral muscular foot, the lower-layer limiter is disposed directly below the lower-layer air cavity, the lower-layer connecting airways connect the lower-layer air cavities with the lower-layer air hole, the lower-layer air hole is provided in one side of the lower deformation layer, and the lower-layer air hole is connected with an external air source;
the strain sensor is buried in the ventral muscular foot in the long side direction of the ventral muscular foot, the strain sensor comprises a strain channel and a conductive liquid, and the conductive liquid is encapsulated in the strain channel;
the air pressure controlling device comprises a microcontroller, a dual-way air source controller and a strain signal conditioning circuit, the dual-way air source controller comprising a digital-to-analog converter module, an electro-pneumatic proportional valve I and an electro-pneumatic proportional valve II, a signal control end of the DA module being connected to the microcontroller, the DA module producing two analog voltages under the control of the microcontroller, the two analog voltages produced by the DA module being respectively connected to a signal end of the electro-pneumatic proportional valve I and a signal end of the electro-pneumatic proportional valve II, and the electro-pneumatic proportional valve I and the electro-pneumatic proportional valve II outputting corresponding air pressure according to the analog voltages; and
the strain signal conditioning circuit comprises a constant current source generator, a voltage measurement module, a probe I and a probe II, a signal control end of the constant current source generator being connected to the microcontroller, a current output end of the constant current source generator being connected to the probe I, a current input end of the constant current source generator being connected to the probe II, and voltage measurement ends of the voltage measurement module being respectively connected to the current output end and the current input end of the constant current source generator.

2. The dual-airway bionic snail soft robot according to claim 1, wherein the upper-layer limiter limits deformation of the upper-layer air cavity on a side where the upper-layer limiter is located, the lower-layer limiter limits deformation of the lower-layer air cavity on a side where the lower-layer limiter is located, the lower-layer air cavities and the upper-layer air cavities are staggered, and the lower-layer air cavities do not overlap with the upper-layer air cavities in a vertical direction.

3. The dual-airway bionic snail soft robot according to claim 1, wherein the upper-layer limiter and the lower-layer limiter are cloth strips, gauze or plastic sheets.

4. The dual-airway bionic snail soft robot according to claim 1, wherein the ventral muscular foot is made of silicone rubber.

5. The dual-airway bionic snail soft robot according to claim 1, wherein the conductive liquid is liquid metal and salt water.

6. The dual-airway bionic snail soft robot according to claim 1, wherein the electro-pneumatic proportional valve I and the electro-pneumatic proportional valve II have an equivalent function and can be exchanged in sequence.

7. The dual-airway bionic snail soft robot according to claim 1, wherein an air pressure output end of the electro-pneumatic proportional valve I is connected to the upper-layer air hole, and an air pressure output end of the electro-pneumatic proportional valve II is connected to the lower-layer air hole, the probe I pierces into one end of the strain sensor and keeps contact with the conductive liquid, the probe I pierces into the other end of the strain sensor and keeps contact with the conductive liquid, the microcontroller controls output air pressure of the electro-pneumatic proportional valve I and the electro-pneumatic proportional valve II according to information of the strain sensor, and the microcontroller controls the ventral muscular foot to produce sinusoidal wave motion.

8. The dual-airway bionic snail soft robot according to claim 1, wherein the mucus is glycerin, and the mucus is applied to a position between the ventral muscular foot and a crawling surface.

9. A dual-ventral muscular foot parallel bionic snail soft robot, comprising first and second ones of the dual-airway bionic snail soft robot according to claim 1, wherein:

an air pressure output end of an electro-pneumatic proportional valve I of an air pressure controlling device A of the first one of the dual-airway bionic snail soft robot is connected to an upper-layer air hole of a ventral muscular foot A of the first one of the dual-airway bionic snail soft robot, an air pressure output end of an electro-pneumatic proportional valve II of the air pressure controlling device A is connected to a lower-layer air hole of the ventral muscular foot A, a probe I of the air pressure controlling device A pierces into one end of a strain sensor of the ventral muscular foot A and keeps contact with conductive liquid, and a probe II of the air pressure controlling device A pierces into the other end of the strain sensor of the ventral muscular foot A and keeps contact with the conductive liquid;

an air pressure output end of an electro-pneumatic proportional valve I of an air pressure controlling device B of the second one of the dual-airway bionic snail soft robot is connected to an upper-layer air hole of a ventral muscular foot B of the second one of the dual-airway bionic snail soft robot, an air pressure output end of an electro-pneumatic proportional valve II of the air pressure controlling device B is connected to a lower-layer air hole of the ventral muscular foot B, a probe I of the air pressure controlling device B pierces into one end of a strain sensor of the ventral muscular foot B and keeps contact with conductive liquid, and a probe II of the air pressure controlling device B pierces into the other end of the strain sensor of the ventral muscular foot B and keeps in contact with the conductive liquid;

one end of the ventral muscular foot A and one end of the ventral muscular foot B are fixedly mounted through a connecting rod A, the other end of the ventral muscular foot A and the other end of the ventral muscular foot B are fixedly mounted through a connecting rod B, and the ventral muscular foot A is parallel to the ventral muscular foot B; and mucus is applied to a position between the ventral muscular foot A and a crawling surface and a position between the ventral muscular foot B and the crawling surface.

* * * * *